May 8, 1962        I. L. GLERUM        3,033,032

DYNAMOMETER

Filed Oct. 6, 1958        2 Sheets-Sheet 1

INVENTOR.
IRVIN L. GLERUM
BY Elliott & Pastoriza
ATTORNEYS.

May 8, 1962   I. L. GLERUM   3,033,032
DYNAMOMETER

Filed Oct. 6, 1958   2 Sheets-Sheet 2

INVENTOR.
IRVIN L. GLERUM
BY Elliott & Pastoriza
·ATTORNEYS·

# United States Patent Office 3,033,032
Patented May 8, 1962

3,033,032
DYNAMOMETER
Irvin L. Glerum, Canoga Park, Calif., assignor to W. C. Dillon & Company, Inc., a corporation of California
Filed Oct. 6, 1958, Ser. No. 765,593
4 Claims. (Cl. 73—141)

This invention generally relates to dynamometers of the type employed in measuring exerted forces, and more particularly concerns an improvement constituting a remote reading dynamometer.

An object of the present invention is to provide simplified electrical transducer means for measuring deflection in a member.

Another object of the present invention is to provide a remote reading dynamometer which is simple and rugged in its construction, and which will accommodate a wide range of loads with a minimum number of adjustments to be made in the field.

Another object of the present invention is to provide a remote reading dynamometer for measuring exerted force which may be easily maintained, conveniently used, and readily recalibrated by the user, if necessary, in the field.

Another object of the present invention is to provide a remote reading dynamometer for measuring exerted forces which will yield substantially linear readings proportional to the exerted force imposed and be susceptible of a high degree of accuracy.

Another object of the present invention is to provide a remote reading dynamometer which is not harmed by overloads several times its normal operating range.

Still another object of the present invention is to provide a remote reading dynamometer for measuring exerted force which may be relatively economically manufactured, and yet which may be conveniently used under most operating conditions over a long period of life with appreciably no maintenance.

These and other objects and advantages of the present invention are generally attained by providing a dynamometer the combination comprising a flexible bar having integral angularly disposed portions, as set forth, for example, in Patent Numbers 2,285,500 and 2,287,299.

Means are provided for applying force to the angularly disposed portions for effecting flexure of the bar according to the force applied. First support means are rigidly connected to a first portion of the bar and second support means are rigidly connected to a second portion of the bar. Transducer means, preferably of an electric type, are coupled between the first and second support means for providing an electrical signal as a function of the flexure of the bar.

Indicating means are coupled in responsive relationship to the transducer means. Of course, in the event that electrical transducer means are employed a source of electric power is provided for connection thereto.

Although the invention will be described as embodied in dynamometer constructions, it will be appreciated that certain features of the invention, for example, the transducer means, are applicable to other measuring requirements in which a function of a member's deflection under load is to be ascertained.

A better understanding of the present invention will be had by reference to the drawings showing merely an illustrative embodiment, and in which.

Figure 1:
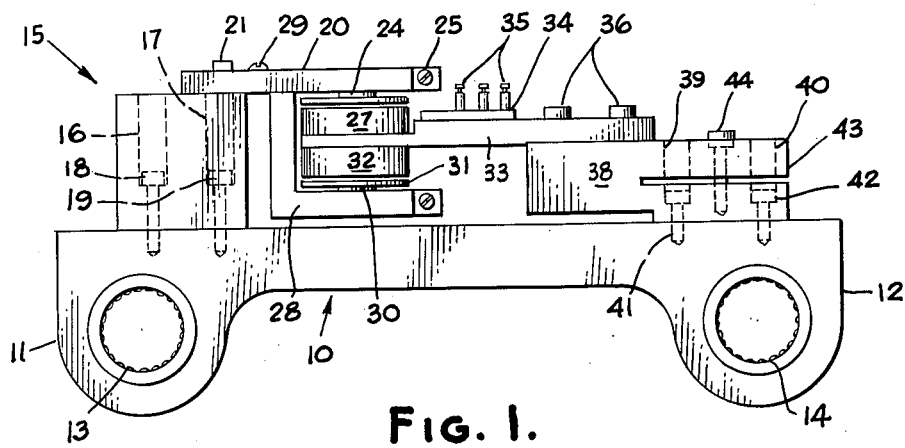
FIGURE 1 is a side elevational view of the main components of the remote reading dynamometer according to the present invention.

Referring now to the drawings, there is shown in FIGURE 1 a flexible member or bar 10, similar to bar 11 of Patent No. 2,287,299, heretofore mentioned. The bar 10 is provided at its opposing ends with angularly disposed portions 11 and 12 integrally formed therewith. The angularly disposed portions 11 and 12 include, respectively, openings 13 and 14 for coupling to exerted forces as described in detail in the latter mentioned patent. The bar structure, as such, is not deemed to be new or form a part of the present invention except insofar as it functions together with the remainder of the structure in an overall combination.

The bar 10, as seen in the left hand portion of FIGURE 1, has mounted thereon a support means 15 in the form of a block-like member. The support member 15 has extending vertically therethrough a bore 16 and a bore 17 adapted to receive, respectively, screws 18 and 19 for rigidly securing the support means 15 to the bar 10. The bores 16 and 17 are slightly larger in diameter than the respective screws 18 and 19 disposed therein in order that the screws 18 and 19 may be recessed within the block member 15.

A slidable bar 20 is mounted on the support member 15 as with screws 21. In order to enable limited movement of the bar 20 with respect to the support member 15, bar 20 is provided with slots 22 (as more clearly seen in the view of FIGURE 2) enabling sliding action of the bar 20 with respect to the screws 21 and the block 15.

The distal end portion of the bar 20 is provided with a lengthwise slot 23 embodying an enlarged opening to receive a vertical mounted screw 24. Another screw 25 is mounted laterally on the bar 20 in a recessed end portion in order to provide means of tightening the slot 23 and thus locking screw 24 in a conventional manner.

Figure 3:
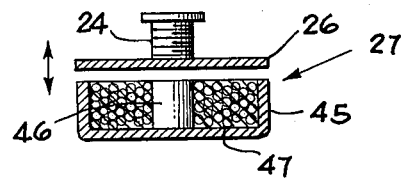
FIGURE 3 is an enlarged sectional view of one of the transformer units shown in FIGURE 1.

The screw 24 has rigidly coupled to its lower end or integrally formed therewith a disc 26 of magnetic material, as more clearly shown in the view of FIGURE 3. With this type of construction, it is evident that the screw 24 may be adjusted vertically, according to the view of FIGURE 3, to correspondingly raise or lower the disc 26. Thereafter, the screw 25 may be tightened to lock the screw 24 in any given position according to proper disposition of the disc 26, all in accordance with a feature of the present invention to be hereafter described. In this regard, the disc 26 co-operates with and forms a part of a transformer 27 mounted therebelow. The bar 20 has rigidly connected thereto a right-angular member 28, which includes a vertical portion coupled to the bar 20 with screws 29 and a horizontal portion disposed in spaced relationship below the disc 26 and transformer 27. The bar 28 has connected thereto another screw 30 connected to a lower disc 31. The disc 31 is adaptable for vertical locked adjustment with respect to another transformer 32 by an equivalent structure to the co-operating slot 23 and screw 25 as previously described. Thus, by adjusting screws 24 and 30 and locking them into desired given positions, discs 26 and 31 may be respectively spaced at various positions from the adjacent transformers 27 and 32.

The transformers 27 and 32 as such are rigidly connected to a bar 33. The bar 33 has mounted thereon a flat terminal board or member 34 provided with terminals 35.

Figure 2:
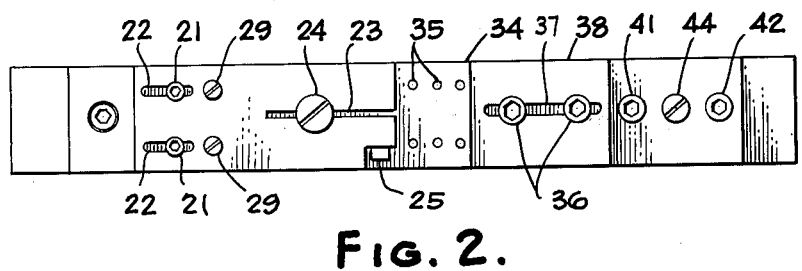
FIGURE 2 is a top elevational view of the parts shown in FIGURE 1.

The bar 33 is itself supported by screws 36 which extend through a slot to connect with another support means or block member 38, as best seen in the views of FIGURES 1 and 2.

The block member 38 is provided with bores 39 and 40 extending therethrough to receive recessed screws 41 and 42. Preferably, the block member 38 is also provided with a slotted opening 43, which may be closed adjustably by a screw 44.

Thus, with this type of construction the bar 33 may be moved horizontally according to the co-operation of the slot 37 with the screws 36 a limited distance.

The transformers 27 and 32 are of identical construction and are disposed in opposing relationship as seen in FIGURE 1. Thus, a description of one will suffice for both. As seen in FIGURE 3, the transformer 27 includes a cup-shaped casing 45 in which is axially disposed a core 46. Surrounding the core 46 are the coils 47 of the transformer, suitably provided with leads (not shown). It is thus evident that the spacing between the disc 26 and the rim of the casing 45 will determine the voltage output of the transformer; thus, by decreasing the spacing, the voltage output will be correspondingly increased, and by increasing the spacing the voltage output will be correspondingly decreased.

Figure 4:
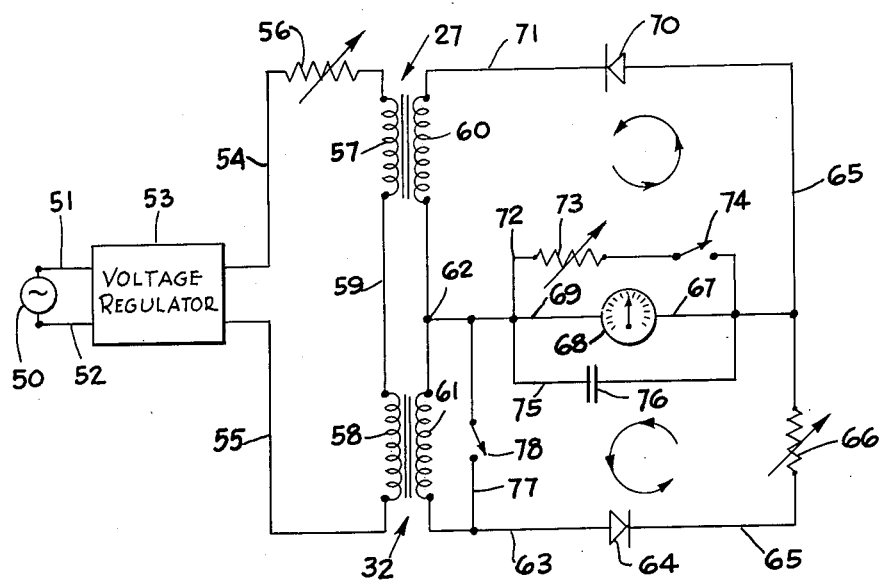
FIGURE 4 is a schematic wiring diagram of the electrical circuit used in conjunction with the dynamometer construction shown in FIGURE 1.

The electrical circuit forming a part of the remote reading dynamometer of the present invention is shown illustratively in FIGURE 4. The circuit consists of a conventional source 50 of 110 volt A.C. power. Leads 51 and 52 connect with the source of a voltage regulator 53, for example, consisting of Zener diodes and associated resistances.

Leads 54 and 55 connect with the other side of the voltage regulator with one of the leads 54 thereafter connected through a variable resistance 56 to the primary coil 57 of transformer 27. The other lead 55 connects to the primary 58 of transformer 32. The primaries 57 and 58 of the transformers 27 and 32, respectively, are connected together in series "bucking" relationship as schematically illustrated by 59.

The secondaries 60 and 61 of the transformers 27 and 32, respectively, are connected together at a common junction point 62.

The other end of the secondary 61, identified as lead 63, connects with a rectifier 64 and thereafter through a lead 65 to a potentiometer 66. A circuit 67 connects with the other side of the potentiometer to one side of a voltmeter 68, with the other side of the meter 68 being connected through line 69 back to the junction point 62. It is evident with this type of circuit that current will flow in the direction of the circular arrow as indicated.

The line 65 after branching off through the line 67 to the meter 68 continues to connect with a rectifier 70 which in turn connects through line 71 to the other side of the secondary 60.

With this type of circuit arrangement, the voltage from the transformer 27 will cause a current to flow in one direction through the meter 68, while the voltage from the transformer 32 will cause current to flow in the reverse direction as heretofore mentioned.

The meter 68 has disposed in parallel therewith a line 72 including a resistance 73 and a normally open switch 74. On the other side of the meter 68 there is provided in parallel relationship therewith a line 75 including a condenser 76. The meter 68 is designed to read half-scale in a static position, for example, a 500–0–500 meter.

Another line 77 is connected between lines 63 and 69 so as to short circuit the secondary 61 upon closing of a normally open switch 78.

The operation of the remote reading dynamometer of the present invention may now be described in conjunction with the calibration thereof.

It will be appreciated that under a tensile or compressive load imposed on the angular portions 11 and 12 of the bar 10, a bowing or deflection will occur in the intermediate portion of the bar to in turn cause relative angular movement between the supporting bars 20 and 33. In turn, the transformers 27 and 32 connected to the bar 33 will move relatively to the discs 26 and 31 coupled to the bar 20. As a consequence of this movement, assuming a tensile load, for example, the spacing between transformer 32 and disc 31 will decrease, and the spacing between transformer 27 and disc 26 will increase.

Thus, the transformers 27 and 32 and co-operating discs 26 and 31, respectively, function as an electrical transducer means yielding an electrical function as a measurement of the mechanical deflection and loading. The discs 26 and 31, as such, also function as control means to vary the voltage output of the respective transformers.

With this basic operation in mind, certain adjustments are made during manufacture. The bar 33 is first horizontally adjusted by means of screws 36 co-operating with slot 37 to obtain a predetermined deflection relative to flexure of the bar 10 under load. Thereafter, the bar 20 is horizontally adjusted with screws 21 co-operating with slots 22 such that the discs 26 and 31 are properly centered co-axially with the transformers 27 and 32.

After these adjustments have been made, resistance 66 is set to a zero position and a half known load is imposed on the bar 10. Then, discs 26 and 31 are vertically adjusted to approximately equal spacing such that the voltage output is equal from each transformer 27 and 32, whereby the meter 68 will read half-scale. After this half-load adjustment, a full known load is placed on the bar 10 and resistance 56 is varied in order to obtain a full dial or scale reading. The resistance 66 is now adjusted with no load to obtain a zero reading on the meter.

The final factory adjustment consists in establishing a reference voltage by closing switches 78 and 74 and thereafter adjusting resistance 73 to obtain a maximum dial or full scale reading. Thus, with switch 78 closed, the secondary 61 of transformer 32 will be short circuited and full voltage from transformer 27 applied to meter 68.

It will be appreciated with the many mechanical and electrical adjustments available that the meter may be properly precalibrated to obtain substantially linear readings under varying load conditions and also such that the meter 68 may be employed under a wide load range.

In operation in the field, the switches 74 and 78 are closed and the resistance 56 adjusted to obtain a predetermined maximum voltage setting indicated on the meter. Thereafter, with the switches 74 and 78 open, the proper zero setting is attained by adjusting resistance 66 as heretofore mentioned. Then with the switches open, the dynamometer bar 10 may be subjected to the load and the meter 68 will indicate the differential voltage or current as a consequence of the bucking relationship of transformers 27 and 32, which in turn will be proportional to the relative variation in spacing between the corresponding disc and transformers.

The condenser 76 which is in parallel continually with the meter 68 serves to damp the higher frequencies to which the meter 68 would normally be subjected.

Under conditions in which a tare load is applied, before measurements are taken, screw 44 is adjusted to in turn effect movement of bar 33 and transformers 27 and 32 coupled thereto. Thus, the indicator arm may be set to a zero scale position for any particular tare load. By proper design, tare loads 100% or more of full load may be compensated for by means of this simple screw adjustment.

It will be evident that no damage will occur to the dynamometer under overload conditions up to 500% overload, for example. Thus, even assuming an extreme condition in which a permanent set results in bar 33 because of deflection thereof during overloading, it is only necessary to reestablish the proper zero and maximum scale positions as heretofore mentioned.

It is apparent that the remote reading dynamometer of the present invention not only enables a simplified mechanical structure subject to a variety of adjustments, but also uniquely co-operates with the associated electrical circuit which may be precisely and simply adjusted to obtain approximate linearity in meter readings over a wide range of loads during operation in the field.

It will be seen to those skilled in the art that many changes and modifications may be made in the remote reading dynamometer without departing from the spirit and scope of the invention. Furthermore, as heretofore mentioned, the features of the present invention are equally advantageous employed in conjunction with other applications in which a member is deflected and measurements of deflection or load applied are required.

What is claimed is:

1. A transducer means for converting deflection of an elongated member into a voltage measurement, said transducer means comprising: first support means connected to a first portion of said member; second support means connected to a second portion of said member, said second support means being spaced from said first support means; a pair of transformers having the primaries thereof and secondaries thereof, respectively, connected in series, said pair of transformers being connected to said first support means for movement therewith, and each of said transformers comprising a cup-shaped casing, a core axially positioned therein, and coil means disposed in the annular space between said core and said casing; magnetic means connected to said second support means for movement therewith and cooperating with said pair of transformers to vary the voltage output of said transformers inversely one with respect to the other in response to said deflection of said member, said magnetic means comprising a pair of magnetic discs, respectively, spaced in axial alignment with the open end of each said casing, said magnetic discs being coupled to said second support means in relationship to the respective transformers such that deflection of said member will effect movement of one of said discs towards its adjacent casing and movement of the other of said discs away from its adjacent casing; indicating means connected to one side of said transformers adapted to measure the output voltage differential of said transformers; and a source of electrical power connected to the other side of said transformers.

2. The subject matter, according to claim 1, in which said indicating means is connected to the junction point and outside terminals of the secondaries of said transformers; and, rectifier means connected to said indicating means to cause current flow therethrough in opposing directions responsive, respectively, to the voltage of first transformer secondary and said second transformer secondary.

3. A transducer means for converting deflection of a member into a voltage measurement, said transducer means comprising: first support means connected to a first portion of said member; second support means connected to a second portion of said member, said second support means being spaced from said first support means; a pair of transformers connected to said first support means for movement therewith, said transformers each comprising a cup-shaped casing, a core axially positioned therein, and coil means disposed in the annular space between said core and said casing; magnetic means connected to said second support means for movement therewith and cooperating with said pair of transformers to vary the voltage output of said transformers inversely one with respect to the other in response to said deflection of said member, said magnetic means comprising a pair of magnetic discs, respectively, spaced in axial alignment with the open end of each said casing, said magnetic discs being coupled to said second support means in relationship to the respective transformers such that deflection of said member will effect movement of one of said discs towards its adjacent casing and movement of the other of said discs away from its adjacent casing; indicating means connected to one side of said transformers adapted to measure the output voltage differential of said transformers; and a source of electrical power connected to the other side of said transformers.

4. A transducer means for converting deflection of a member into a voltage measurement, said transducer means comprising: a pair of transformers supported from a first portion of said member, said transformers each comprising a cup-shaped casing, a core axially positioned therein and coil means disposed in the annular space between said core and said casing; magnetic means connected to a second portion of said member and designed to cooperate with said pair of transformers, said magnetic means comprising a pair of magnetic discs, respectively, spaced in axial alignment with the open end of each said transformer casing, said magnetic discs being coupled to the second portion of said member such that deflection of said member will effect movement of one of said discs towards its adjacent casing and movement of the other of said discs away from its adjacent casing; indicating means connected to one side of said transformers adapted to measure the output voltage differential of said transformers; and, a source of electrical power connected to the other side of said transformers.

References Cited in the file of this patent

UNITED STATES PATENTS

| | | |
|---|---|---|
| 1,906,551 | De Forest | May 2, 1933 |
| 2,287,299 | Dillon | June 23, 1942 |
| 2,623,386 | Baker | Dec. 30, 1952 |
| 2,683,989 | Clark | July 20, 1954 |